US005811026A

United States Patent [19]
Phillips et al.

[11] Patent Number: 5,811,026
[45] Date of Patent: Sep. 22, 1998

[54] CORROSION INHIBITOR FOR AQUEOUS AMMONIA ABSORPTION SYSTEM

[75] Inventors: Benjamin A. Phillips, Benton Harbor; Eugene P. Whitlow, St. Joseph, both of Mich.

[73] Assignee: Phillips Engineering Company, St. Joseph, Mich.

[21] Appl. No.: 696,789

[22] Filed: Aug. 14, 1996

[51] Int. Cl.$^6$ ............................... C09K 5/04; F25B 15/04
[52] U.S. Cl. ............................... 252/74; 252/68; 252/74; 252/76; 252/389.4; 252/389.54; 252/389.62; 252/394; 210/696; 422/13; 62/112
[58] Field of Search .................................. 252/68, 74, 76, 252/71, 389.62, 69, 389.4, 394, 389.54; 210/696; 422/13; 62/112

[56] References Cited

U.S. PATENT DOCUMENTS

| | | | |
|---|---|---|---|
| 2,755,170 | 7/1956 | Stubblefield et al. | 23/89 |
| 2,972,581 | 2/1961 | Johnson et al. | 252/75 |
| 3,503,438 | 3/1970 | Geyer | 165/105 |
| 3,555,841 | 1/1971 | Modahl et al. | 62/114 |
| 3,580,759 | 5/1971 | Albertson et al. | 252/71 |
| 3,609,086 | 9/1971 | Modahl et al. | 252/68 |
| 3,609,087 | 9/1971 | Chi et al. | 252/69 |
| 4,019,992 | 4/1977 | Krueger | 252/68 |
| 4,043,387 | 8/1977 | Lamp | 165/105 |
| 4,159,737 | 7/1979 | Biermann et al. | 165/105 |
| 4,237,090 | 12/1980 | DeMonbrun et al. | 422/13 |
| 4,333,894 | 6/1982 | Hoppe et al. | 261/96 |

(List continued on next page.)

OTHER PUBLICATIONS

B. E. Wilde, "The Influence of Hydrogen, Oxygen, and Ammonia on the Corrosion Behavior of Plain Carbon Steel in High Temperature Water," vol. 24, No. 10, Corrosion—NACE, Oct., 1968, pp. 338–343.

E. C. McKelvy and Aaron Isaacs, "Causes and Prevention of the Formation of Noncondensible Gases in Ammonia Absorption Refrigeration Machines," Technologic Papers of the Bureau of Standard, (1920) No. 180, Oct. 25, 1920, pp. 1–10.

K. F. Dockus, R.H. Krueger and W. F. Rush, "Corrosion Inhibition in Lithium Bromide Absorption Refrigeration Systems," Ashrae Transactions, vol. 69, (1968), p. 190.

Morris Cohen, "The Breakdown and Repair of Inhibitive Films in Neutral Solution, " The Journal of Science and Engineering, vol. 32, No. 12, Dec., 1976, pp. 461–465.

M. Cohen, "An Electron Diffraction Study of Films Formed By Sodium Nitrite Solution on Iron," The Journal of Physical Chemistry, vol. 56, 1952, pp. 451–453.

J.E.O. Mayne and M.J. Pryor, "The Mechanism of Inhibition of Corrision of Iron by Chromic Acid and Potassium Chromate," The Journal of Chemistry Society, 1949, pp. 1831–1835.

*Primary Examiner*—Sharon Gibson
*Assistant Examiner*—Deanna Baxam
*Attorney, Agent, or Firm*—Finnegan, Henderson, Farabow, Garrett & Dunner, L.L.P.

[57] ABSTRACT

A method of inhibiting corrosion and the formation of hydrogen and thus improving absorption in an ammonia/water absorption refrigeration, air conditioning or heat pump system by maintaining the hydroxyl ion concentration of the aqueous ammonia working fluid within a selected range under anaerobic conditions at temperatures up to 425° F. This hydroxyl ion concentration is maintained by introducing to the aqueous ammonia working fluid an inhibitor in an amount effective to produce a hydroxyl ion concentration corresponding to a normality of the inhibitor relative to the water content ranging from about 0.015 N to about 0.2 N at 25° C. Also, working fluids for inhibiting the corrosion of carbon steel and resulting hydrogen formation and improving absorption in an ammonia/water absorption system under anaerobic conditions at up to 425° F. The working fluids may be aqueous solutions of ammonia and a strong base or aqueous solutions of ammonia, a strong base, and a specified buffer.

14 Claims, 5 Drawing Sheets

U.S. PATENT DOCUMENTS

| | | | |
|---|---|---|---|
| 4,364,900 | 12/1982 | Burrill | 376/306 |
| 4,382,008 | 5/1983 | Boreland et al. | 252/75 |
| 4,561,259 | 12/1985 | van der Sluys | 62/107 |
| 4,564,465 | 1/1986 | Bibber | 252/389 R |
| 4,567,736 | 2/1986 | van der Sluys et al. | 62/736 |
| 4,586,561 | 5/1986 | Franco et al. | 165/1 |
| 4,588,513 | 5/1986 | Triebel et al. | 252/75 |
| 4,619,119 | 10/1986 | Dijkstra et al. | 62/324.2 |
| 4,663,053 | 5/1987 | Geiger | 210/699 |
| 4,728,452 | 3/1988 | Hansen | 252/75 |
| 4,884,628 | 12/1989 | En-Jian et al. | 165/104.27 |
| 4,895,003 | 1/1990 | Houghton et al. | 62/476 |
| 4,915,872 | 4/1990 | Ciuba et al. | 252/389.3 |
| 4,926,659 | 5/1990 | Christensen et al. | 62/476 |
| 4,946,595 | 8/1990 | Miller, Jr. | 210/651 |
| 4,963,290 | 10/1990 | Bressan et al. | 252/387 |
| 5,002,697 | 3/1991 | Crucil et al. | 252/389.23 |
| 5,067,330 | 11/1991 | Cook et al. | 62/485 |
| 5,082,592 | 1/1992 | McDonald | 252/389.4 |
| 5,097,676 | 3/1992 | Erickson | 62/476 |
| 5,108,499 | 4/1992 | Dalton | 106/14.44 |
| 5,192,447 | 3/1993 | Fivizzani | 210/697 |
| 5,230,810 | 7/1993 | Clark et al. | 210/743 |
| 5,320,779 | 6/1994 | Fivizzani | 252/394 |
| 5,342,578 | 8/1994 | Agrawal et al. | 422/13 |
| 5,547,600 | 8/1996 | Downey | 252/68 |

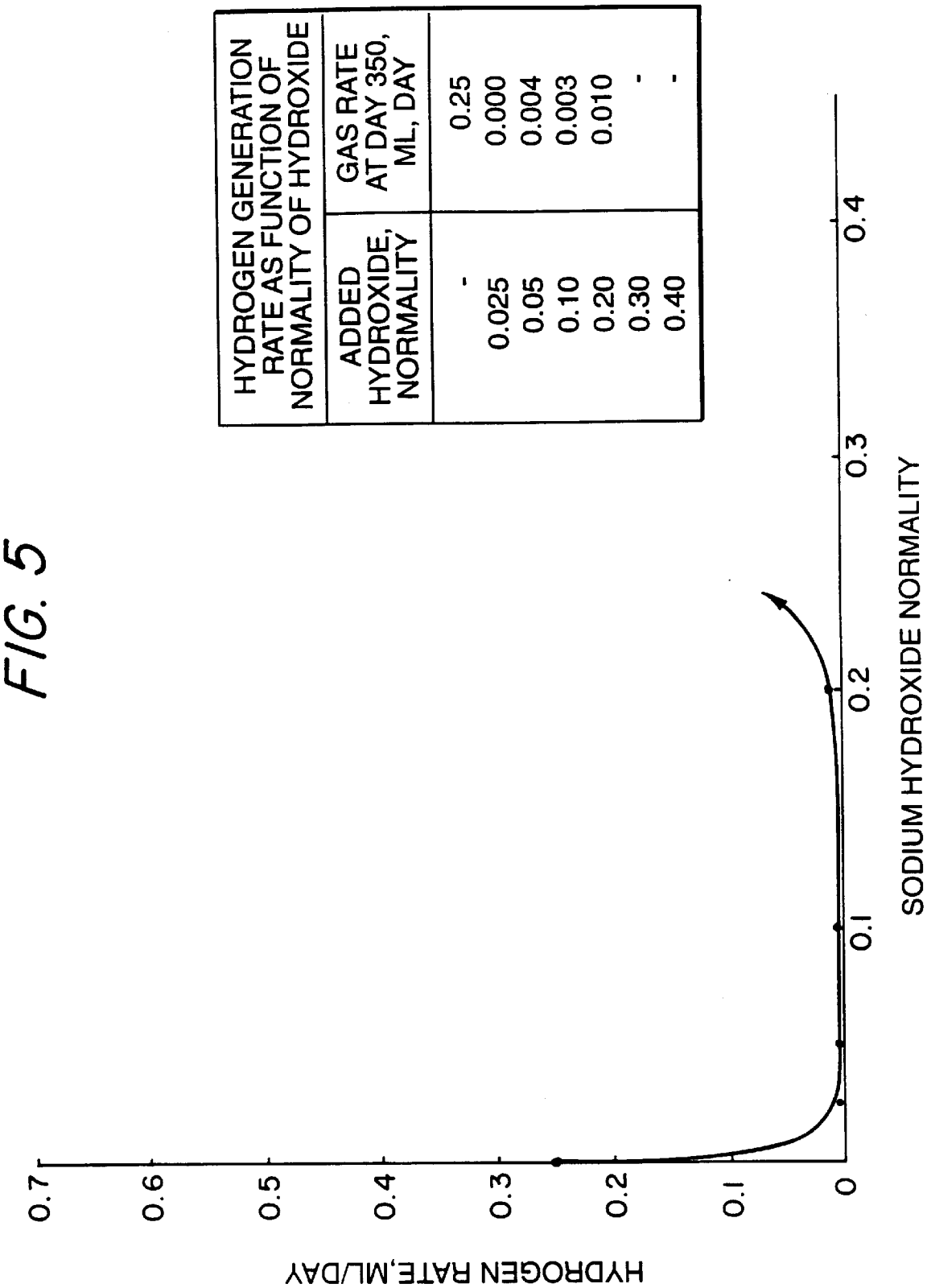

CORROSION INHIBITOR FOR AQUEOUS AMMONIA ABSORPTION SYSTEM

GOVERNMENT RIGHTS

This invention was made with Government support under contract 15X-17497C awarded by the United States Department of Energy. The United States Government has certain rights in this invention.

BACKGROUND OF THE INVENTION

1. Field of the Invention

The present invention relates to absorption refrigeration, air conditioning or heat pump systems and to a method and composition for inhibiting corrosion and the formation of hydrogen in such systems. More particularly, the present invention relates to inhibitor compositions for aqueous ammonia working fluids for use in steel absorption refrigeration, air conditioning or heat pump systems.

2. Description of Related Art

For the construction of absorption refrigeration, air conditioning or heat pump systems (hereinafter "absorption systems") using an ammonia/water working fluid, the preferred material of design is steel. Steel is readily available, economical, and easily formed and welded. Steel, however, is susceptible to corrosion in the ammonia/water environment at the temperatures of the working fluid. Also, hydrogen gas is formed from reactions between the ammonia/water working fluid and the steel, which is detrimental to system efficiency.

At the elevated operating temperatures and substantially anaerobic conditions present in an absorption system apparatus, a series of reactions can take place between the water in the aqueous ammonia working fluid and the iron in steel to form iron oxides and hydrogen gas. Generally, it is considered that the principal reactions are:

$$Fe+H_2O \rightarrow FeO+H_2$$

$$2FeO+H_2O \rightarrow Fe_2O_3+H_2$$

$$3FeO+H_2O \rightarrow Fe_3O_4+H_2$$

Because the working fluid recirculates in a substantially closed system within the absorption system apparatus, the noncondensible hydrogen accumulates in the system, collecting primarily in the condenser and absorber sections. There, the ammonia vapor is condensed or absorbed from the mixture of ammonia vapor and hydrogen, leaving the hydrogen at the condensation and absorption surfaces. The hydrogen accumulated at those surfaces hampers the condensation and absorption of ammonia refrigerant from the vapor phase and thereby prevents the apparatus from sustaining full absorption and condensation capacity. Moreover, the ferric oxide and other products of corrosion, such as ferric hydroxide, do not adhere well to steel surfaces and can create sludge in the absorption system.

To limit the detrimental effect of accumulated hydrogen gas on operation of the absorption system apparatus, the gas can be collected in chambers at the end of the condenser or absorber surfaces, and periodically removed from the system through a manually operated vent, such as a valve. The disadvantages of this approach are readily apparent. The operation of a valve is inconvenient and can be troublesome, and unavoidable valve leakage compromises the hermetic integrity of the system.

The use of strong bases and/or buffers as corrosion inhibitors has been proposed for absorption systems using aqueous alkali metal halide working fluids, such as lithium bromide. For example, U.S. Pat. No. 4,963,290 discloses corrosion inhibitors for use in lithium bromide/water absorption heat pumps consisting of a strong base, an alkali molybdate, and an alkali phosphate. The alkali phosphates of these corrosion inhibitors, however, are environmentally undesirable.

U.S. Pat. No. 2,755,170 proposes the use of molybdates as inhibitors, optionally with a strong base, in aqueous lithium bromide or chloride absorption systems to adjust the alkalinity of the working fluid to a normality ranging between 0.0316 and 0.316. It is well known in this field, however, that the chemistry of ammonia/water systems differs significantly from that of aqueous lithium halide systems because of the presence of ammonia. Thus, many inhibitors that work well in aqueous lithium halide systems do not perform well in ammonia/water systems, and vice-versa.

Other prior art attempts to inhibit the corrosion of steel and the generation of noncondensible hydrogen in absorption systems have significant disadvantages. U.S. Pat. Nos. 3,609,086, 4,019,992, and 3,555,841 disclose the use of arsenic trioxide to control corrosion and hydrogen generation in a lithium bromide/water absorption refrigeration system. Arsenic trioxide is highly toxic and therefore presents health risks to persons exposed during manufacture, maintenance, or otherwise to working fluids containing them.

Moreover, the aforementioned five patents relate to lithium halide absorption systems, which are not typically operated at the high temperatures of ammonia/water systems. In addition, lithium halide absorption systems have limited applicability as heat pumps because the refrigerant, water, freezes at 32° F. Thus, such systems are not practical for use in winter residential space heating.

U.S. Pat. No. 5,342,578 discloses the use of a corrosion inhibiting silicon compound, such as sodium silicate, in ammonia-water absorption systems. This patent discloses that it is "well known that the presence of ammonia can make a significant difference in solution chemistry. It can be shown that many inhibitors that function in aqueous systems (water only) will not function once the ammonia exceeds a critical concentration." Col. 1, lines 62–66.

Traditionally, for ammonia/water absorption systems, sodium chromate has been added to the working fluid to protect against corrosion and reduce formation of hydrogen to tolerable levels. The generally accepted explanation for the inhibition effected by sodium chromate is that the chromate oxidizes the iron in steel to form a coating of magnetite on the steel, which protects the steel from further attack by water. See, Cohen, M., Corrosion, 32, p. 461 (1976); Cohen, M., J. Phys. Chem., 56, p. 451 (1952); Mayne, J.E.O., Pryor, M.J., J. Chem. Soc., p. 1831 (1949). The oxidation reaction, however, gradually consumes the chromate, and therefore either a relatively large quantity of chromate must be provided initially, or the chromate must be replaced periodically to maintain the desired inhibition.

Further, chromates are toxic, and their use is increasingly being limited by environmental and health concerns. For example, government regulations have made it unlawful to discharge chromates into the environment. "Hazardous Chemicals-Information and Disposal Guide," Armour, Browne & Weir, 2nd Ed., University of Alberta, Edmonton, p. 240 (1984). In addition, topical exposure to chromates can cause dermatological disorders.

SUMMARY OF THE INVENTION

The present invention provides a composition, method and apparatus that substantially obviates one or more of the limitations and disadvantages of the prior art.

To achieve these and other advantages and in accordance with the purpose of the invention, as embodied and broadly described herein, the invention provides a method of inhibiting corrosion and the formation of hydrogen in a steel absorption system apparatus. The method uses an aqueous ammonia working fluid under anaerobic conditions at temperatures up to about 425° F. The method involves introducing to the aqueous ammonia working fluid an inhibitor in an amount effective to produce a hydroxyl ion concentration corresponding to a normality of the inhibitor relative to the water content ranging from about 0.015N to about 0.2N at 25° C.

In another aspect of the present invention, as embodied and broadly described herein, there is provided a composition for use as a working fluid in a steel absorption system. The composition is for use under anaerobic conditions at temperatures up to about 425° F. The composition contains aqueous ammonia, and an inhibitor in an amount effective to produce a hydroxyl ion concentration corresponding to a normality of the inhibitor relative to the water content ranging from about 0.015N to about 0.2N at 25° C.

In still another aspect of the present invention, as embodied and broadly described herein, a steel absorption system apparatus is provided including an absorber, a generator, a condenser, an evaporator and a working fluid. The working fluid includes aqueous ammonia, and an inhibitor in an amount effective to produce a hydroxyl ion concentration corresponding to a normality of the inhibitor relative to the water content ranging from about 0.015N to about 0.2N at 25° C.

In accordance with the invention, the inhibitor may be a strong base, such as sodium hydroxide, potassium hydroxide, cesium hydroxide, or lithium hydroxide. The inhibitor of the invention may also include a buffer, such as an alkali metal molybdate, borate or acetate.

Additional features and advantages of the invention will be set forth in the description that follows. In part, the features and advantages of the invention will be apparent from the description or may be learned by practice of the invention. The objectives and other advantages of the invention will be realized and attained by the methods, compositions, and apparatus particularly pointed out in the written description and claims.

It is to be understood that both the foregoing general description and the following detailed description are exemplary and explanatory and are intended to provide further explanation of the invention as claimed.

The accompanying drawings are included to provide a further understanding of the invention, are incorporated in and constitute a part of the present specification, and, together with the description, serve to explain the principles of the invention.

BRIEF DESCRIPTION OF THE DRAWINGS

FIG. 5 is a graphical representation of the rate of hydrogen generation at day 350 plotted as a function of the normality of the inhibitor in the water of the working fluid after addition of strong base.

DETAILED DESCRIPTION OF THE INVENTION

In accordance with the present invention, as embodied and broadly described herein, a method, apparatus and composition is provided for inhibiting corrosion and the formation of hydrogen in a steel absorption refrigeration, air conditioning or heat pump apparatus using an aqueous ammonia working fluid under anaerobic conditions at temperatures up to about 425° F.

Figure 1:
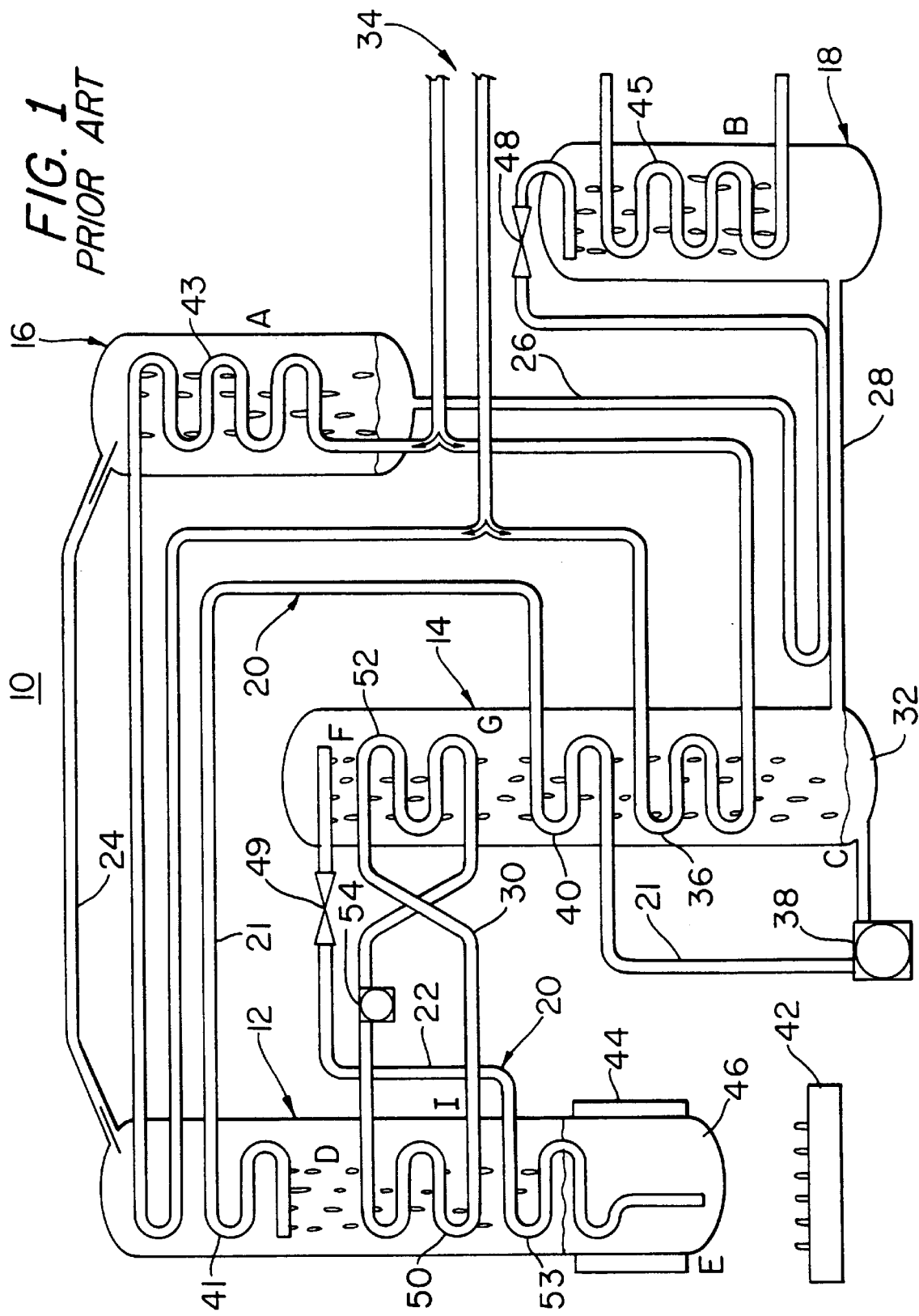
FIG. 1 is a schematic representation of a typical prior art absorption system.

Reference will now be made in detail to the present preferred embodiments of the invention. FIG. 1 is a simplified schematic illustrating an absorption refrigeration, air conditioning or heat pump apparatus 10. The primary construction material is steel, preferably low carbon steel, which is subject to the corrosive effects of the aqueous ammonia working fluid. Ammonia functions as the refrigerant and the dilute aqueous ammonia solution functions as the absorbent. As used herein, the term "concentrated solution" refers to a solution rich in ammonia and the term "dilute solution" refers to a solution weak in ammonia.

The apparatus 10 of FIG. 1 illustrates a generator-absorber-heat exchange ("GAX") apparatus consisting of four basic components, a generator 12, a condenser 16, an evaporator 18 and an absorber 14, along with connecting conduits to convey the working fluids. A solution pump 38 circulates the rich solution from the absorber, which operates at a relatively low pressure, to the generator, which operates at a relatively higher pressure. Generator 12 and condenser 16 are the higher pressure components and evaporator 18 and absorber 14 are the lower pressure components. The higher pressure components are separated from the lower pressure components by a refrigerant flow restrictor 48 in conduit 26, a weak solution flow restrictor 49 in conduit 22 and solution pump 38 in conduit 21.

In operation, heat is added to generator 12 from some source such as burner 42 to evaporate ammonia along with a small amount of water vapor from the aqueous ammonia solution. Thus, the bottom end of generator 12 is the highest temperature zone in the system and may approach 425° F. Generator 12 gets progressively cooler toward its top end. The ammonia vapor, along with a small amount of water vapor, travels upward from the boiling liquid in the bottom end of generator 12. As the vapor travels upward, it contacts progressively cooler and progressively more concentrated aqueous ammonia solution. Water vapor is transferred from the vapor to the liquid solution and a thermally equivalent amount of ammonia is evaporated from the concentrated solution dripping downward. Finally, the vapor contacts the surface of cooling coil 41 (reflux condenser) on which most of the last traces of water vapor condense, and the substantially pure ammonia vapor leaves generator 12 through conduit 24. Conduit 24 conveys the ammonia vapor to condenser 16 where it condenses to substantially pure liquid ammonia on the surface of coil 43, which is cooled by coolant flowing through coil 43.

From condenser 16 the substantially pure liquid ammonia flows through conduit 26 to restrictor 48 where the pressure is reduced to the pressure in evaporator 18. Enroute from condenser 16 to restrictor 48, conduit 26 is in thermal contact with conduit 28 carrying low-temperature ammonia vapor from evaporator 18 to absorber 14, so that the liquid ammonia (refrigerant) is partially cooled by this heat exchange. In evaporator 18, the liquid ammonia is distributed over the surface of coil 45. At the low pressure existing in evaporator 18, the refrigerant evaporates at a low temperature and absorbs heat from the fluid flowing through coil 45. From evaporator 18, the ammonia vapor flows through conduit 28 into absorber 14. Dilute solution flows from the bottom of generator 12 through conduit 20, through flow restrictor 49, and into the top of absorber 14. A part of conduit 20 is heat exchange coil 53; the high temperature dilute solution is cooled by the cooler concentrated liquid flowing over the outside surface of heat exchange coil 53. The weak solution entering the top of absorber 14 through conduit 20 is distributed over heat exchange coil 52, then over heat exchange coil 40, and finally over heat exchange coil 36. The purpose of heat exchange coils 52, 40 and 36 is to remove the heat of absorption and to progressively cool the absorbing solution so that it can continue to absorb ammonia, causing it to become more concentrated as it flows downward in absorber 14. Thus, absorber 14 is hottest at the top where the most dilute absorbing solution contacts the ammonia vapor and coolest at the bottom where the more concentrated absorbing solution contacts the entering ammonia vapor.

Generator 12, on the other hand, is hottest at the bottom end and coolest at the top end. The hotter zones of absorber 14 operate at temperatures higher than the cooler zones of generator 12. Heat exchange coils 40, 52, and 50 are so arranged that heat rejected from absorber 14 is transferred to generator 12. Rejected absorber heat transferred to generator 12 reduces the heat required from burner 42 by an equivalent amount and thus improves the efficiency of the system. Concentrated solution from absorber 14 flowing through conduit 21 picks up heat from the intermediate temperature zone of absorber 14 while passing through heat exchange coil 40 and carries this heat as heated liquid into generator 12. The temperature at the top or hottest end of absorber 14 is higher than the temperature of the intermediate zone of generator 12, and a runaround loop consisting of heat exchange coils 50 and 52, heat exchange conduit 30, circulating pump 54, and an enclosed heat transfer fluid is provided to transfer this absorber heat to generator 12. Finally, heat exchange coil 36, cooled by a coolant such as water or a water/antifreeze mixture, is provided to further cool the absorbing solution to provide optimum operating conditions for the system.

The present invention is of particularly advantageous use in absorption systems using an aqueous ammonia working fluid under anaerobic conditions at temperatures up to about 425° F. The working fluid preferably has an ammonia concentration that may range from about 1% to about 50% by weight of solution.

The present inventors have found that corrosion and the accompanying hydrogen formation can be almost completely eliminated by maintaining the hydroxyl ion concentration of the working fluid within a specified range. However, because of the uncertainty in determining the pH of the working fluid at the elevated operating temperatures found in ammonia/water absorption systems, the hydroxyl ion concentration produced by the inhibitor added to the working fluid is expressed in normality (N) of the inhibitor relative to the water content at 25° C. As used herein, the term normality refers to the normality of the inhibitor in the water prior to the addition of ammonia.

Thus, the present inventors have found that corrosion and hydrogen formation can be most effectively inhibited in ammonia/water absorption systems by introducing an inhibitor to the aqueous ammonia working fluid in an amount effective to maintain a hydroxyl ion concentration corresponding to a normality of the inhibitor relative to the water ranging from about 0.015N to about 0.2N at 25° C., preferably about 0.025N to about 0.2N. The inhibitor of the present invention is composed of materials that are non-reactive and do not decompose during operation of the absorption system, and thus remain at the proper concentration indefinitely.

In accordance with a preferred embodiment of the invention, as embodied and broadly described herein, a strong base can be added to the aqueous ammonia working fluid to maintain the desired hydroxyl ion concentration. The strong base can be any strong base or mixture of strong bases known in the art as long as it is effective to maintain an hydroxyl ion concentration in the working fluid corresponding to a normality of the strong base relative to the water content ranging from about 0.015N to about 0.2N at 25° C.

Examples of strong bases suitable for use in the present invention include, for example, alkali metal bases, such as sodium hydroxide, potassium hydroxide, lithium hydroxide, cesium hydroxide. Preferably, the strong base is lithium hydroxide, LiOH, or a hydrated lithium hydroxide, $LiOH.H_2O$, or sodium hydroxide, NaOH.

The base or mixture of bases may be in any suitable form prior to addition to the water, such as, for example, an amorphous solid, a crystalline solid, in solution, or a hydrate. Alternatively, the base may be furnished to the working fluid as the product of a reaction in the fluid. For example, sodium hydroxide could be introduced into the working fluid by adding sodium nitrite or sodium peroxide to the water. The sodium nitrite or peroxide will react in the ammonia/water working fluid to form sodium hydroxide.

In accordance with another preferred embodiment of the invention, as embodied and broadly described herein, the working fluid may include, in addition to the strong base, a buffer that is a non-reactive salt of a weak acid and a strong base. As used herein, the term "non-reactive" means not reactive with the ammonia/water working fluid or other materials in the system, such as steel, under anaerobic conditions at temperatures up to about 425° F. The buffer should be soluble in the aqueous ammonia solution, and non-toxic. Buffers suitable for use with the strong base in the present invention include, for example, sodium borate, lithium borate, potassium borate, cesium borate, sodium molybdate, lithium molybdate, potassium molybdate, cesium molybdate, sodium acetate, lithium acetate, potassium acetate, and cesium acetate, or combinations thereof. Preferably, the buffer is sodium borate decahydrate, $Na_2B_4O_7.10H_2O$, also known as borax. The buffers may also be in any available form prior to addition to the working fluid, including, for example, but not limited to, an amorphous solid, a crystalline solid, an aqueous solution, or a hydrate.

In accordance with the invention, the concentration of buffer for use with the strong base preferably ranges from about 0.03 mole percent to about 0.2 mole percent based on the water content of the solution, and more preferably ranges from about 0.03 mole percent to about 0.1 mole percent. It is desirable to maintain the buffer concentration as low as feasible to avoid the possibility that the buffer might precipitate at the higher ammonia concentrations found at the exit of the absorber.

The following examples are intended to illustrate, and not limit, the present invention.

EXAMPLES

1) Experimental Corrosion Test Apparatus

Figure 2:
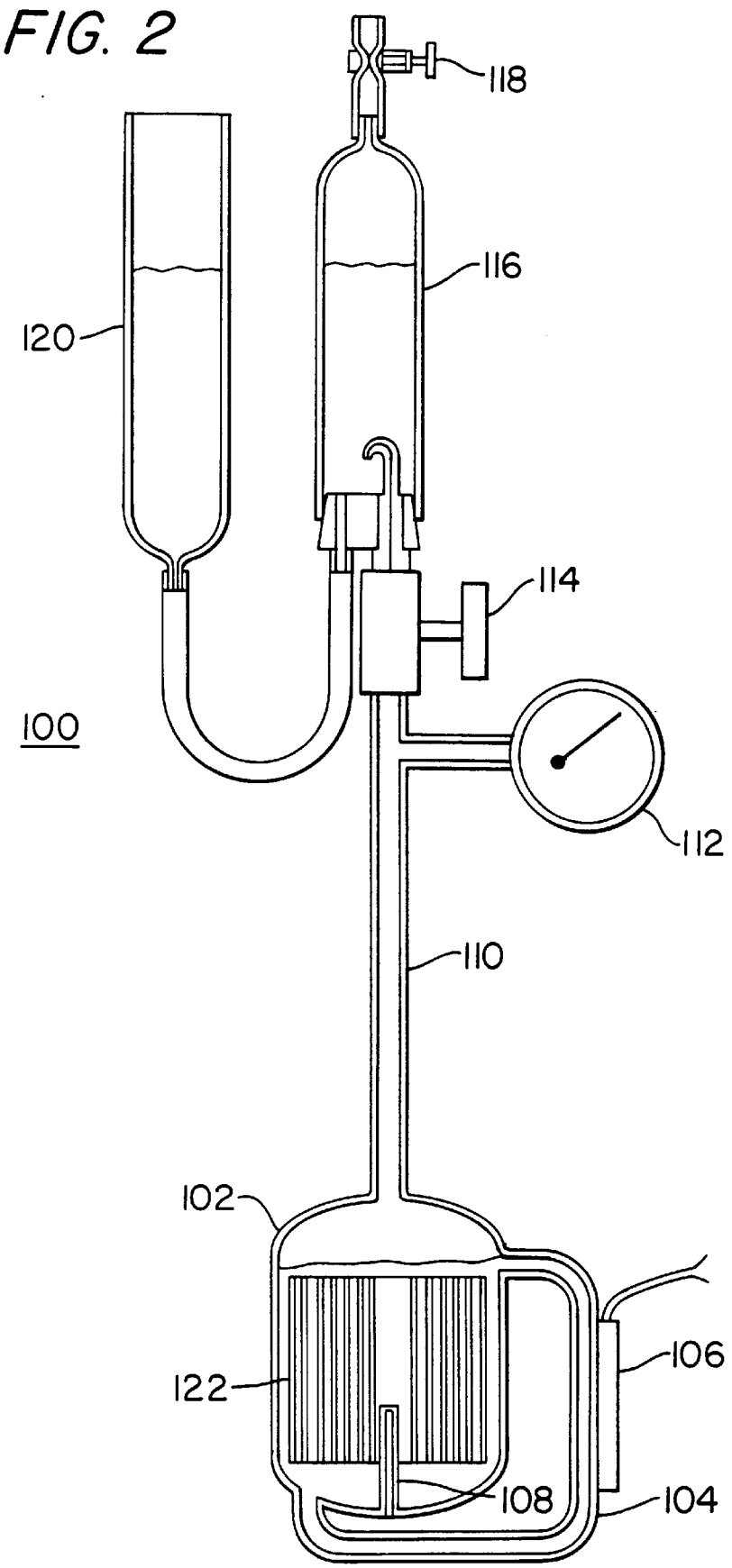
FIG. 2 is a schematic representation of the apparatus used to test the compositions according to the present invention that are described in the examples herein.

A test apparatus 100 was assembled as shown in FIG. 2. Test apparatus 100 was designed to operate at conditions simulating those in the hottest part of the generator, and has boiling surfaces, peak temperatures that accelerate the corrosion reactions, and a recirculating ammonia/water working fluid. To obtain a good measurement of the reaction with steel, apparatus 100 has a large exposed steel surface and a means for separating the quantities of hydrogen formed from the liquid and vapor in the apparatus. The apparatus enables the measurement of hydrogen generated by venting it into a volumetrically graduated tube filled with water, which absorbs any ammonia vapor that enters with the hydrogen gas.

Test apparatus 100 was provided with a sealed, mild steel, vertical, cylindrical sample chamber 102 approximately 5" high and 3" in diameter. The sample chamber was provided with a pump tube 104 in communication with the interior of sample chamber 102, in contact with a heater 106, and returning to the interior of sample chamber 102. Sample chamber 102 was insulated with high temperature insulation kaowool. During operation of apparatus 100, working fluid was circulated via pump tube 104 from sample chamber 102 to the section adjacent heater 106, where it was heated to a boiling temperature forming bubbles, which caused the working fluid to flow to sample chamber 102. The sample temperature was monitored by means of a temperature well 108 extending into the interior of sample chamber 102. Exiting the top of sample chamber 102 is gas collection tube 110 fitted with a pressure gauge 112. Gas collection tube 110 communicates through a valve 114 with water-filled gas measurement chamber 116 having a pinch clamp 118 and a liquid leveling tube 120.

Uninsulated gas collection tube 110 served as the heat dissipation portion of the apparatus, the body of the apparatus being thermally insulated. As heat was applied by heater 106, the solution partially vaporized, releasing ammonia vapor plus a little water vapor. This mixed vapor flowed up into gas collection tube 110 where it contacted the cooler walls of tube 110, which is not insulated. Any hydrogen in the apparatus was swept along with these vapors. The water vapor tended to condense first, and then, as the vapor contacted the cooler sections of gas collection tube 110, the ammonia vapor condensed. The hydrogen was thus pushed to the top of the tube, most of the water vapor and ammonia vapor having been condensed.

To measure the volume of hydrogen gas, the gas was released through valve 114 into the water-filled gas measurement chamber 116 where it bubbled to the top of the chamber. Any trace of ammonia in the hydrogen was absorbed by the water; thus the hydrogen volume at the top was essentially pure hydrogen. When bubbles no longer broke through the surface of the liquid in gas measurement chamber 116, the hydrogen had been removed from gas collection tube 110 and valve 114 was closed.

All parts were cleaned before final assembly. A steel sample 122 in the form of a spiraled coupon (i.e., strip) of 1010 or 1008 carbon steel measuring 4" by 36" by 0.024" thick was fixed in sample chamber 102. The samples had two square feet of exposed surface area and the sample chamber 102 had about another ¼ square foot. Test apparatus 100 was welded together and leak tested. Sample chamber 102 was then filled to a level just above the top of sample 122 with the working fluid being tested. Test apparatus 100 was then evacuated and sealed. Heater 106 was turned on and the sample temperature monitored through temperature well 108. When sample 122 reached the operating temperature of about 400° F. to 420° F., usually in about three to four hours, the measurement of evolution of hydrogen gas commenced. The rate of hydrogen gas generation in ml/day was measured by determining the volume (in ml) of fluid displaced in gas measurement chamber 116 and dividing that volume by the number of days since the last measurement. At the beginning of a test, the hydrogen generation rate was high and the gas measurement was made every few days. As the protective film was developed, the rate decreased and the gas measurements could be made less frequently.

It is believed that the initial amounts of hydrogen generation are high because it takes a certain amount of time for the inhibitor to form a protective coating on the surface of the steel.

The first measurement after a test was started was of questionable reliability because of air and absorbed gases that may have remained in the chamber after evacuation. It was not practical to pull a hard vacuum because that would have involved an excessive loss of ammonia from the solution. It was up to the judgment of the operator to stop the evacuation process when it was felt that most of the air had been removed, but before too much ammonia was lost. Consequently, the initial gas measurements may show some inconsistent variations not otherwise explainable.

Another possible source of variation in the measurements was the temperature control. Occasionally, a thermostat may stick, allowing the temperature to exceed the 400°–420° F. targeted range. If this happened at night or on a weekend, the temperature may have been too high for a matter of hours. Above about 425° F., the hydrogen generation rate increased markedly, so such accidental temperature increases could have resulted in seemingly illogical variations in gas rate.

In the following Examples, an amount of hydrogen generation of 0.03 ml/day or below at atmospheric pressure was set as the target. This value was determined by calculating the amount of hydrogen that could be stored in a chamber of practical size in a residential heat pump unit operating for 20 years, and then making the appropriate conversion for the laboratory scale tests.

In the Examples, the normality refers to the normality of the inhibitor after addition to the water prior to addition of ammonia. The percentages given are by weight.

Comparative Example 1

Cell #167

Charge: 10% $NH_3/H_2O$, without inhibitor

| Test Duration Days | Average Gas Rate ml/Day |
| --- | --- |
| 7 | 0.71 |
| 35 | 0.14 |
| 68 | 0.12 |
| 97 | 0.10 |
| 129 | 0.13 |
| 160 | 0.10 |
| 193 | 0.09 |
| 222 | 0.10 |
| 243 | 0.11 |
| 273 | 0.13 |
| 306 | 0.15 |
| 334 | 0.21 |
| 367 | 0.27 |

-continued

| Test Duration Days | Average Gas Rate ml/Day |
|---|---|
| 395 | 0.25 |
| 427 | 0.31 |
| 458 | 0.32 |
| 486 | 0.29 |
| 518 | 0.16 |

Example 1

Cell #132X

Charge: 10% $NH_3/H_2O$, NaOH, 0.025N

| Test Duration Days | Average Gas Rate ml/Day |
|---|---|
| 2 | 2.9 |
| 5 | 0.17 |
| 12 | 0.06 |
| 42 | 0.01 |
| 71 | 0.007 |
| 100 | 0.005 |
| 161 | 0.005 |
| 223 | 0.003 |
| 254 | 0.000 |
| 350 | 0.000 |

Example 2

Cell #135X

Charge: 10% $NH_3/H_2O$, NaOH, 0.050N

| Test Duration Days | Average Gas Rate ml/Day |
|---|---|
| 2 | 2.2 |
| 5 | 0.4 |
| 12 | 0.01 |
| 71 | 0.005 |
| 100 | 0.003 |
| 161 | 0.003 |
| 223 | 0.012 |
| 350 | 0.004 |

Example 3

Cell #152X

Charge: 10% $NH_3/H_2O$, NaOH, 0.1N

| Test Duration Days | Average Gas Rate ml/Day |
|---|---|
| 2 | 0.4 |
| 5 | 0.23 |
| 12 | 0.07 |
| 42 | 0.02 |
| 71 | 0.009 |
| 99 | 0.01 |
| 129 | 0.02 |
| 224 | 0.003 |
| 347 | 0.003 |

Example 4

Cell #153X

Charge: 10% $NH_3/H_2O$, NaOH, 0.2N

| Test Duration Days | Average Gas Rate ml/Day |
|---|---|
| 2 | 0.7 |
| 5 | 0.27 |
| 12 | 0.20 |
| 42 | 0.02 |
| 71 | 0.03 |
| 100 | 0.01 |
| 161 | 0.02 |
| 223 | 0.01 |
| 254 | 0.02 |
| 350 | 0.011 |

Comparative Example 2

Cell #184X

Charge: 10% $NH_3/H_2O$, NaOH, 0.3N

| Test Duration Days | Average Gas Rate ml/Day |
|---|---|
| 2 | 0.45 |
| 5 | 15.0 |
| 9 | 20.2 |
| 12 | 31.7 |
| 16 | 27.2 |
| 20 | 20.1 |
| 28 | 14.6 |
| 33 | 10.4 |
| 40 | 7.4 |
| 42 | 8.7 |
| 50 | 8.3 |
| Test Stopped | |

Comparative Example 3

Cell #185X

Charge: 10% $NH_3/H_2O$, NaOH, 0.4N

| Test Duration Days | Average Gas Rate ml/Day |
|---|---|
| 1 | 150 |
| 2 | 98 |
| 5 | 297 |
| 7 | 238 |
| 9 | 231 |
| 12 | 267 |
| Test Stopped | |

Figure 3:
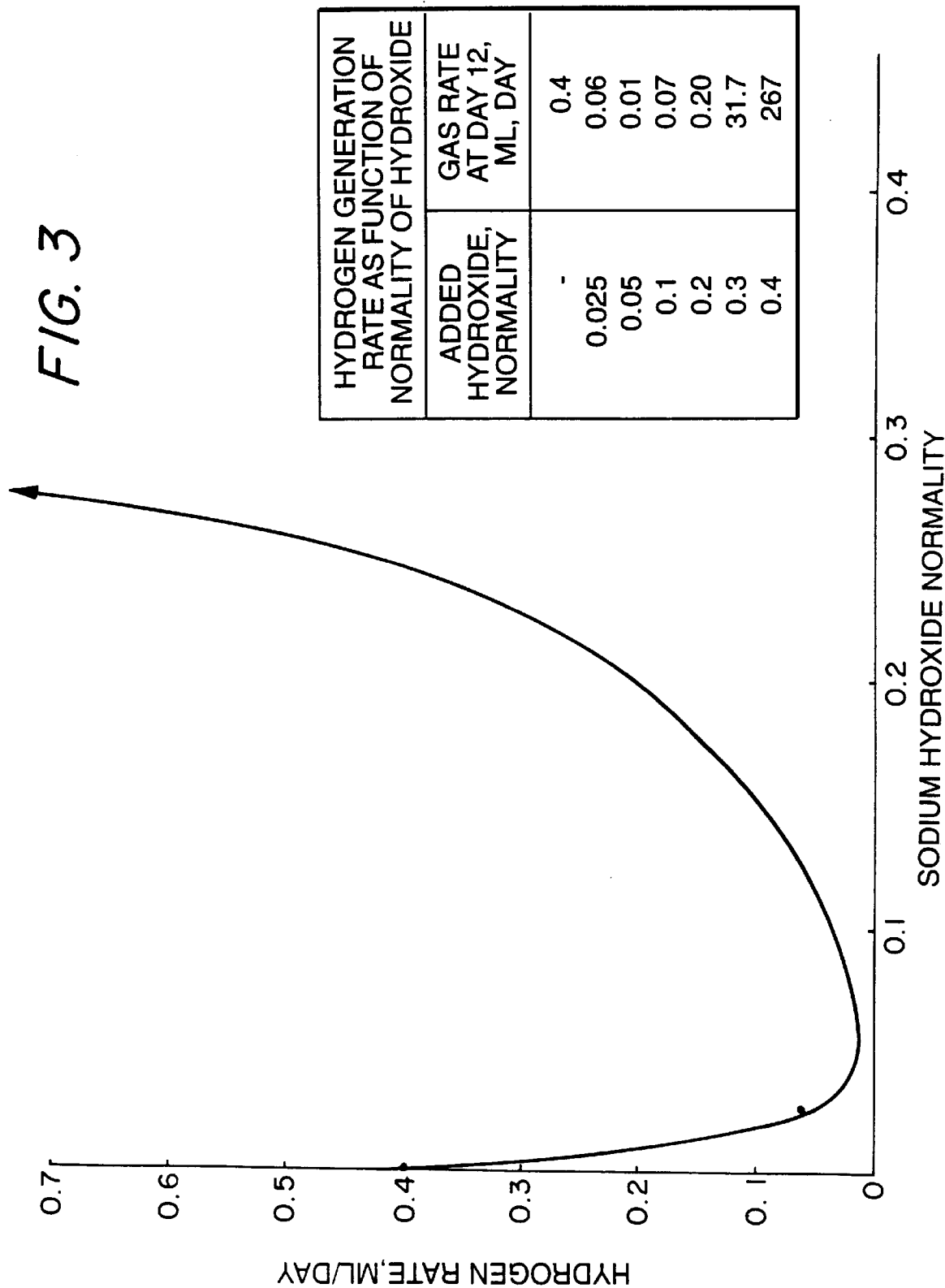
FIG. 3 is a graphical representation of the rate of hydrogen generation at day 12 plotted as a function of the normality of the inhibitor in the water of the working fluid after addition of strong base.
Figure 4:
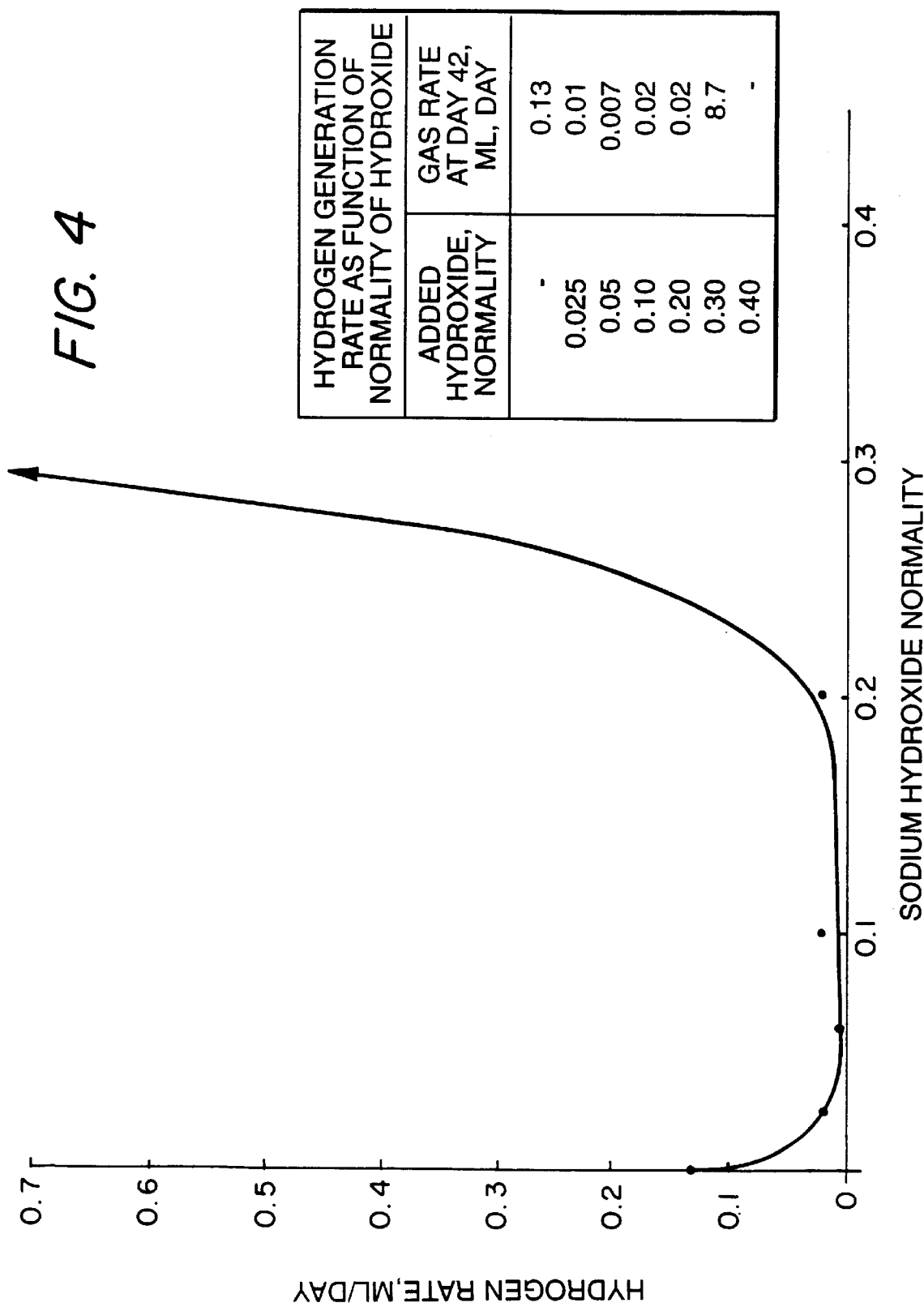
FIG. 4 is a graphical representation of the rate of hydrogen generation at day 42 plotted as a function of the normality of the inhibitor in the water of the working fluid after addition of strong base.

The results of Comparative Examples 1 through 3 and Examples 1 through 4 are plotted in FIGS. 3 through 5. The results are plotted at days 12, 42, and 350. It can be seen from this data that maintaining a normality of the inhibitor relative to the water content ranging from about 0.015N to about 0.2N, and especially from about 0.025N to about 0.2N, provides a very low rate of hydrogen generation, while normalities outside that range exhibit much higher rates of hydrogen generation.

Example 5

Cell #174

Charge: 10% $NH_3/H_2O$, LiOH. 0.25N

| Test Duration Days | Average Gas Rate ml/Day |
|---|---|
| 1 | 2.0 |
| 9 | 0.13 |
| 37 | <0.04 |
| 70 | <0.03 |
| 99 | <0.03 |
| 131 | <0.03 |
| 162 | <<0.03 |
| 195 | <<0.03 |
| 224 | <<0.03 |
| 251 | 0.00 |

Example 6

Cell #172

Charge: 10% $NH_3/H_2O$, LiOH. 0.05N

| Test Duration Days | Average Gas Rate ml/Day |
|---|---|
| 1 | 2.0 |
| 9 | 0.25 |
| 37 | 0.04 |
| 70 | 0.03 |
| 100 | <0.03 |
| 131 | <0.03 |
| 162 | <<0.03 |

Example 7

Cell #171

Charge: 10% $NH_3/H_2O$, LiOH. 0.1N

| Test Duration Days | Average Gas Rate ml/Day |
|---|---|
| 1 | 2.0 |
| 9 | 0.13 |
| 37 | <0.04 |
| 70 | <0.03 |
| 99 | 0.0 |
| 131 | 0.0 |
| 162 | 0.0 |
| 195 | <<0.03 |
| 224 | 0.0 |
| 251 | 0.0 |

Example 8

Cell #170

Charge: 10% $NH_3/H_2O$, LiOH, 0.2N

| Test Duration Days | Average Gas Rate ml/Day |
|---|---|
| 1 | 4.0 |
| 9 | 0.38 |
| 37 | 0.07 |
| 70 | 0.03 |
| 99 | 0.0 |
| 131 | <0.03 |
| 162 | <<0.03 |
| 198 | <<0.03 |
| 224 | <0.03 |
| 251 | <0.03 |

Examples 5 through 8 illustrate that the use of LiOH in accordance with the invention provides a very low rate of hydrogen generation when the normality of the inhibitor is maintained between about 0.015N and 0.2N, particularly between about 0.025 and 0.2N.

Example 9

Cell #151

Charge: 10% $NH_3/H_2O$, 0.6 wt. % Borax

| Test Duration Days | Average Gas Rate ml/Day |
|---|---|
| 5 | 0.8 |
| 22 | 0.29 |
| 55 | 0.30 |
| 96 | 0.37 |
| Test stopped, added LiOH, 0.054N | |
| 1 | 2 |
| 15 | 0.14 |
| 42 | 0.07 |
| 75 | 0.03 |
| 104 | <0.03 |
| 167 | 0.03 |
| 256 | <0.03 |
| Test stopped to analyze solution | |

Example 10

Cell #152

Charge: 10% $NH_3/H_2O$, 0.6 wt. % Borax

| Test Duration Days | Average Gas Rate ml/Day |
|---|---|
| 5 | 0.6 |
| 22 | 0.29 |
| 55 | 0.15 |
| 96 | 0.44 |
| Test stopped - added LiOH, 0.054N | |
| 1 | 1.0 |
| 14 | 0.21 |
| 42 | 0.07 |
| 75 | 0.06 |
| 104 | 0.03 |
| 136 | <0.03 |
| 229 | <0.03 |
| 317 | 0.00 |
| 435 | 0.00 |
| 588 | <0.01 |
| 885 | 0.006 |
| 954 | 0.007 |
| Test Terminated | |

Example 11

Cell #132

Charge: 10% NH₃/H₂O, 0.6 wt. % Li₂MoO₄

| Test Duration Days | Average Gas Rate ml/Day |
|---|---|
| 3 | 1.7 |
| 49 | 0.11 |
| 84 | 0.08 |
| 114 | 0.16 |
| 217 | 0.22 |
| 234 | 0.24 |
| Test stopped - cell drained and recharged: | |
| 10% NH₃/H₂O, 1.7 wt. % Li₂MoO₄, LiOH, 0.12N | |
| 9 | 0.33 |
| 38 | <0.03 |
| 70 | 0.0 |
| 101 | 0.0 |
| 134 | 0.0 |
| 455 | <0.01 |
| 792 | 0.0 |

Example 12

Cell #134

Charge: 10% NH₃/H₂O, 1.1 wt. % (NH₄)₂MoO₄

| Test Duration Days | Average Gas Rate ml/Day |
|---|---|
| 9 | 0.67 |
| 17 | 0.25 |
| 29 | 0.17 |
| 162 | 0.15 |
| 182 | 0.20 |
| Test stopped, added NaOH, 0.13N | |
| 24 | 0.24 |
| 87 | 0.07 |
| 119 | 0.03 |
| 240 | 0.03 |
| 452 | <0.07 |
| 1,152 | 0.04 |
| Test Terminated | |

The results of Examples 9 through 12 show that the combination of a strong base and a buffer in accordance with the invention produces a very low rate of hydrogen generation, and thus is effective as an inhibitor.

It will be apparent to those skilled in the art that various modifications and variations can be made in the methods, compositions, or apparatus of the present invention without departing from the spirit or scope of the invention. Thus, it is intended that the present invention cover the modifications and variations of the present invention provided they come within the scope of the appended claims and their equivalents.

What is claimed is:

1. A method of inhibiting corrosion and the formation of hydrogen in a steel absorption refrigeration, air conditioning or heat pump apparatus using an aqueous ammonia working fluid under anaerobic conditions at temperatures up to about 425° F., comprising introducing to the aqueous ammonia working fluid a strong base in an amount effective to produce a hydroxyl ion concentration corresponding to a normality of the strong base in the water prior to the addition of ammonia ranging from about 0.015N to about 0.2N at 25° C.

2. The method of claim 1, wherein the working fluid has an ammonia concentration ranging from about 1% to about 50% by weight of solution.

3. The method of claim 1, wherein the strong base is selected from the group consisting of sodium hydroxide, potassium hydroxide, cesium hydroxide, lithium hydroxide, and combinations thereof.

4. The method of claim 3, wherein the sodium hydroxide, potassium hydroxide, cesium hydroxide or lithium hydroxide strong base is introduced to the aqueous ammonia working fluid by adding the corresponding peroxide.

5. The method of claim 1, further comprising adding a buffer selected from the group consisting of sodium molybdate, lithium molybdate, potassium molybdate, cesium molybdate, sodium borate, lithium borate, cesium borate, potassium borate, sodium acetate, lithium acetate, potassium acetate and cesium acetate.

6. The method of claim 5, wherein the buffer is selected from the group consisting of lithium borate, sodium borate, cesium borate and potassium borate.

7. The method of claim 5, wherein the strong base is sodium hydroxide or lithium hydroxide and the buffer is a hydrated sodium borate.

8. A composition for use as a working fluid in a steel absorption refrigeration, air conditioning or heat pump apparatus under anaerobic conditions at temperatures up to about 425° F., comprising aqueous ammonia, and a strong base present in an amount effective to produce a hydroxyl ion concentration corresponding to a normality of the strong base in the water prior to the addition of ammonia ranging from about 0.015N to about 0.2N at 25° C.

9. The composition of claim 8, wherein the working fluid has an ammonia concentration ranging from about 1% to about 50% by weight of solution.

10. The composition of claim 8, wherein the strong base is selected from the group consisting of sodium hydroxide, potassium hydroxide, cesium hydroxide, lithium hydroxide, and combinations thereof.

11. The composition of claim 10, wherein the sodium hydroxide, potassium hydroxide, cesium hydroxide or lithium hydroxide strong base is introduced to the aqueous ammonia working fluid by adding the corresponding peroxide.

12. The composition of claim 10, further comprising a buffer selected from the group consisting of sodium molybdate, lithium molybdate, potassium molybdate, cesium molybdate, sodium borate, lithium borate, potassium borate, cesium borate, sodium acetate, lithium acetate, cesium acetate, and potassium acetate.

13. The composition of claim 12, wherein the buffer is selected from the group consisting of lithium borate, sodium borate, cesium borate, and potassium borate.

14. The composition of claim 12, wherein the strong base is sodium hydroxide or lithium hydroxide and the buffer is a hydrated sodium borate.

* * * * *